(12) United States Patent
Kloetzer et al.

(10) Patent No.: US 10,518,368 B2
(45) Date of Patent: Dec. 31, 2019

(54) ARRANGEMENT FOR JOINING ELEMENTS OF TURBOMACHINES

(71) Applicant: MTU Aero Engines AG, Munich (DE)

(72) Inventors: Alexander Kloetzer, Fuerstenfeldbruck (DE); Manfred Feldmann, Eichenau (DE)

(73) Assignee: MTU Aero Engines AG, Munich (DE)

( * ) Notice: Subject to any disclaimer, the term of this patent is extended or adjusted under 35 U.S.C. 154(b) by 390 days.

(21) Appl. No.: 15/341,270

(22) Filed: Nov. 2, 2016

(65) Prior Publication Data
US 2017/0129061 A1  May 11, 2017

(30) Foreign Application Priority Data
Nov. 5, 2015  (EP) ..................................... 15193274

(51) Int. Cl.
*F01D 25/24* (2006.01)
*B23P 15/04* (2006.01)

(52) U.S. Cl.
CPC ................................... *B23P 15/04* (2013.01)

(58) Field of Classification Search
USPC .......................... 403/337, 150, 151, 156, 158
See application file for complete search history.

(56) References Cited

U.S. PATENT DOCUMENTS

| | | |
|---|---|---|
| 3,019,035 A | 1/1962 | Klompas |
| 3,722,215 A | 3/1973 | Zhdanov et al. |
| 5,127,224 A | 7/1992 | Barcza et al. |
| 5,848,874 A | 12/1998 | Heumann et al. |
| 6,273,632 B1 | 8/2001 | Takahashi et al. |
| 2013/0223982 A1 | 8/2013 | Durocher et al. |
| 2015/0030385 A1* | 1/2015 | Bucknell ............... F16L 23/036 403/337 |

* cited by examiner

*Primary Examiner* — Ninh H. Nguyen
*Assistant Examiner* — Maxime M Adjagbe
(74) *Attorney, Agent, or Firm* — Barlow, Josephs & Holmes, Ltd.

(57) ABSTRACT

The present invention relates to an arrangement, comprising a first turbomachine element with a first turbomachine element through-opening, a second turbomachine element, a sliding element with a sliding element through-opening that is arranged, at least in part, in the first turbomachine element through-opening, a sleeve that engages through the sliding element through-opening along a through-axis, and a fastening member that engages through the sleeve for fastening the sleeve to the second turbomachine element. Furthermore, the invention relates to a method for fastening the first turbomachine element to the second turbomachine element, a turbomachine with the above-mentioned arrangement, and use of this arrangement.

10 Claims, 3 Drawing Sheets

ARRANGEMENT FOR JOINING ELEMENTS OF TURBOMACHINES

BACKGROUND OF THE INVENTION

Figure 1:
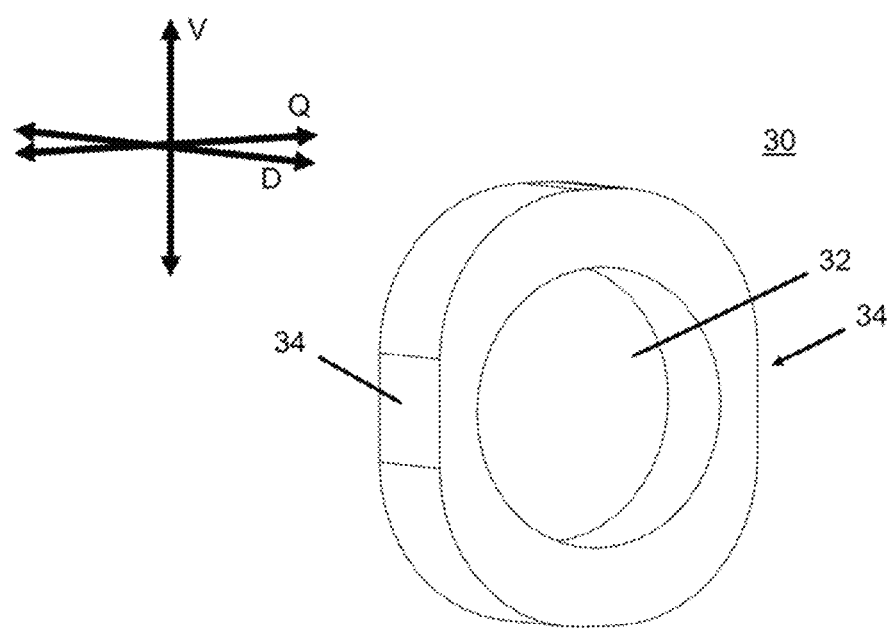

The present invention relates to an arrangement with a first turbomachine element and a second turbomachine element as well as a turbomachine with such an arrangement, and a method for fastening the first turbomachine element to the second turbomachine element.

Connection technology has always played an enormous role in machine construction. In configuring the joining of two machine elements, many factors are to be taken into consideration, such as, for example, the material properties of the two machine elements, the requirements in regard to transmittable forces, torques, and the like. Another important aspect involves the surrounding conditions to which the connection is exposed during its service life. High requirements ensue in this respect, for example, at high temperatures during the operation of a machine, such as, for example, a turbomachine, owing to different expansion coefficients. Demands also ensue when the different construction elements are exposed to various temperatures, so that one component expands to a greater extent than the other.

This problem is countered in two fundamentally different ways: On the one hand, compensation for thermal expansions can occur by way of the flexibility (that is, the elastic deformation) of the machine elements; however, this is often unsuitable at very high temperatures, because an additional load on the machine element(s) arises. Furthermore, this approach is generally suited only for smaller movements.

On the other hand, compensation by way of sliding seats is known from U.S. Pat. No. 5,127,224 A, for example. It is shown therein how a first element in the form of a clevis is joined to a second element in the form of a bracket with a rectangular through-opening; by way of a pin and a slider. In this case, the slider is mounted movably in the rectangular through-opening, while it is held between the two arms of the U-shaped bracket.

SUMMARY OF THE INVENTION

The object of the present invention is to provide an improved arrangement with two machine elements, in particular, turbomachine elements.

This object is achieved by an arrangement according to a turbomachine, a method and use of the arrangement in a turbomachine according to the present invention.

An arrangement according to the invention comprises: a first turbomachine element with a first turbomachine element through-opening, a second turbomachine element, a sliding element with a sliding element through-opening, which is arranged at least in part in the first turbomachine element through-opening, a sleeve that is engaged via the sliding element through-opening along a through-axis, and a fastening member that is engaged through the sleeve and by member of which it is possible or will be possible to fasten the sleeve to the second turbomachine element or, in particular, by member of which the sleeve can be fastened or is fastened to the second turbomachine element, or is designed or equipped for this purpose.

According to one embodiment, this is particularly advantageous, because the force fit occurs between the fastening member, the sleeve, and the second turbomachine element. According to one embodiment, the first turbomachine element is not clamped in place and can, at least substantially, move freely in the direction of rotation around the through-axis and/or along the through-axis.

According to one embodiment, the sleeve is a rotationally symmetric hollow body, which is longer in the direction of the through-axis than the extension of the sliding element; that is, the sleeve extends outward over the sliding element at least on one side and, in particular, on both sides. In this way, according to one embodiment, a clamping force imposed along the through-axis by the fastening member will be transmitted, at least substantially and, in particular, fully, via the sleeve to the second turbomachine element and not via the sliding element and/or the first turbomachine element.

According to one embodiment, the sleeve is designed as a hollow cylinder, that is, without any overhangs. Alternatively, according to an enhancement, the sleeve can have a flange-like collar at one or both ends. This is particularly advantageous, because, in this way, the input or output of force at the ends of the sleeve is improved.

According to one embodiment, the sliding element is provided with a sliding element through-opening in the form of a round hole. This is particularly advantageous in order to minimize any play between the sliding element and the sleeve.

According to one embodiment, the sliding element is made of a material from the group comprising: iron-based material, cobalt-based material, nickel-based material, steel, and ceramic.

According to one embodiment, the first turbomachine element and/or the second turbomachine element are or is a component of a turbomachine, in particular, of a gas turbine, particularly of an aircraft engine, in particular of a casing or housing element, particularly for definition of a gas duct.

According to one embodiment, the first turbomachine element through-opening has an elongated hole in which the sliding element can be displaced along a displacement axis perpendicular to the through-axis and, in particular, its displacement can be guided in a form-fitting manner. In an enhancement, the first turbomachine element through-opening is an elongated hole.

According to one embodiment, this is particularly advantageous, because, in this way, although the movement of the two turbomachine elements toward each other in the direction of the displacement axis is possible, it is nonetheless limited. Thus, it is possible, for example, to compensate for thermally caused stresses and, nevertheless, to always ensure a secure joining of the two joining partners, that is, the two turbomachine elements.

According to an enhancement, the sliding element has a pair of flat contact faces for form-fitting guiding along a displacement axis, said flat contact faces engaging with corresponding, in particular flat, contact faces of the elongated hole.

According to one embodiment, this is particularly advantageous, because, in this way, a force that acts in the direction of a transverse axis, which is directed perpendicular to the through-axis and perpendicular to the displacement axis, is transmitted not pointwise or along a line of contact of the first turbomachine element on the sliding element, but rather over the entire surface in the area of the contact faces, which, in particular, are flat. In this way, the mechanical load of the turbomachine element and the sliding element is reduced, which leads to an increase in safety and/or to a reduction in the requirements placed on the materials from which the first turbomachine element and/or the sliding element are formed.

According to one embodiment, the sliding element is mounted rotatably on the sleeve, in particular around the through-axis.

According to one embodiment, this is particularly advantageous, because, in this way, a relative movement of the two turbomachine elements toward each other is made possible around the through-axis as the axis of rotation. This measure, too, serves to reduce transmitted forces and, in particular, to reduce stresses between the joining partners.

According to one embodiment, the fastening member clamps the sleeve against the second turbomachine element.

According to one embodiment, this is particularly advantageous, because the mechanical connection of the two turbomachine elements in the through-direction, that is, in the direction of the through axis, occurs via the sleeve in one embodiment and, at least substantially, not by way of the sliding element and/or, at least substantially, not directly via the first turbomachine element. According to one embodiment, the first turbomachine element is mounted with play in the through-direction between the second turbomachine element and the fastening member.

According to one embodiment, the first turbomachine element, in particular on the sleeve and/or the sliding element, can be displaced between the second turbomachine element and a stop along the through-axis, said stop being clamped against the sleeve via the fastening member and being connected to the fastening member in a manner such that it can be released without destruction or not without destruction and, in particular, has an integral design.

According to one embodiment, this stop is shaped in terms of its dimensions in such a way that it extends beyond the dimensions of the sliding element, at least in its direction of extension. Thus, the first turbomachine element is prevented from slipping down from the sliding element in the direction of the through-axis. Additionally or alternatively, at least one end of the fastening member, in particular a head, and/or a securing member, in particular in the form of a nut, is designed in such a way that it itself extends beyond the dimensions of the sliding element at least in one direction of extension.

According to one embodiment, this is particularly advantageous, because, in this way, any relative movement of the two turbomachine elements toward each other is made possible along the through-axis. This measure, too, serves to reduce transmitted forces and, in particular, stresses between the joining partners. According to one embodiment, the play is limited by the second turbomachine element and the stop. As a result of this, a compensation of thermally and/or mechanically induced stresses is possible at least in part, while, at the same time, a secure fastening of the two joining partners to each other is ensured.

According to one embodiment, a form-fitting and/or force-fitting connection between the first turbomachine element and the second turbomachine element prevents, at least in part, any relative movement between the first turbomachine element and the second turbomachine element along a transverse axis perpendicular to the through-axis and perpendicular to the displacement axis.

According to one embodiment, this is particularly advantageous, because, in this way, any relative movement of the joining partners in the direction of the transverse axis is suppressed in a defined manner. On account of the arrangement of the fastening member inside of the sleeve and at least in part inside of the second turbomachine element, a force on one of the joining partners in the transverse direction, that is, along the transverse axis, leads to a shear load on the connection member, which, on account of the absent degrees of freedom, has to compensate for this force at least substantially in full and/or has to be transmitted to the other joining partner. This occurs, in particular, by way of the flat contact faces already explained above. Furthermore, according to one embodiment, it is advantageous that at least the first turbomachine element must be able to accommodate the shear stress not in the form of a point or linear load, but rather a transmission of force can be realized over an area, which leads to savings and/or to greater safety factors and/or to less wear in the choice of the material of the first turbomachine element and/or the sliding element.

According to one embodiment, the second turbomachine element has a second turbomachine element opening that is open on one side or on both sides, in which the fastening member engages.

According to one embodiment, the second turbomachine element opening is designed as a blind hole and, in another embodiment, it is designed as a through-opening, in particular for screwing in the fastening member (in each case). The embodiment as a blind hole is advantageous, because it is not necessary to provide any overhanging components on the side of the second turbomachine element lying opposite the joining point. The embodiment as a through-opening is advantageous, because it can be produced in a simple manner and makes it possible to support the fastening member on the side of the second turbomachine element lying opposite to the joining point.

According to one embodiment, the fastening member has a bolt with a bolt head or a screw with a thread and/or a screw head, in particular with one or two nuts screwed onto the screw. In particular, the fastening member is formed by the bolt with the bolt head or the screw with the thread and/or the screw head, in particular with the one or two nuts screwed onto the screw.

According to one embodiment, a force distribution element, which is designed in one part or in multiple parts, is arranged between the fastening member and the sleeve, said force distribution element being inserted, in particular, onto the fastening member. According to one embodiment, the force distribution element has at least one washer.

According to one embodiment, this is particularly advantageous, because, in this way, the clamping force applied by the fastening member is better distributed. An introduction of force via a bounded area, in particular of the bolt or screw head and/or of the nut, is thereby prevented, which leads to savings and/or to greater safety factors in the choice of the material of the fastening member and/or the sleeve.

According to one embodiment, a turbomachine according to the invention, in particular a gas turbine, particularly of an aircraft engine, has an arrangement of the kind described here.

In a preferred embodiment of the invention, the first turbomachine element and the second turbomachine element each have a design that is substantially that of an annulus, with their arrangement being preferably concentric around a machine axis of the turbomachine. In this case, the two turbomachine elements can be joined by at least three connection arrangements, preferably distributed substantially uniformly around the periphery, each connection arrangement of which has a previously-described first turbomachine element through-opening, a previously-described sliding element, a previously-described sleeve, and a previously-described fastening member, so that, in this way, a spoke-centered mounting of the two turbomachine elements relative to each other is ensured. This makes possible, in an advantageous way, a substantially stress-free thermal expansion, in particular in the radial direction with respect to the machine axis of the turbomachine, with, at the same time, secure holding of one of the two turbomachine elements relative to the other turbomachine element.

For further advantages and further embodiments of the turbomachine having such an arrangement, reference is made to the embodiments of the arrangement described here and the respective advantages thereof that have been described.

According to one embodiment, a method according to the invention for fastening the first turbomachine element to the second turbomachine element of the arrangement of the kind described here comprises the steps:
(a) arrangement of the sliding element, at least in part, in the first turbomachine element through-opening;
(b) arrangement of the sleeve, at least in part, in the sliding element through-opening;
(c) arrangement of the second turbomachine element at the first turbomachine element; and
(d) fastening of the sleeve on the second turbomachine element with the fastening member.

The steps described above are not limited to the sequence given. In particular, the step (b) can occur before the step (a) in that, for example, the sleeve is connected to the sliding element before this assembly is arranged at least in part in the first turbomachine element through-opening, in particular by producing at least one contact area on the sleeve for contact with the second turbomachine element and/or with the stop and/or with the fastening member on one or both sides of the sliding element in the through-direction.

In particular, step (c) occurs before step (a) and/or (b) when, first of all, the two turbomachine elements are arranged on each other before the sliding element and/or the sleeve and/or the above-described assembly are or is inserted into the first turbomachine element through-opening.

According to one embodiment, this is particularly advantageous, because, in this way, a joining of the two turbomachine elements to each other can be produced in a very simple manner, in particular without complicated joining methods, such as adhesive bonding, welding, soldering, and the like. According to one embodiment, the fastening by way of the fastening member can be released without destruction, this being advantageous, in particular, for mounting and/or maintenance work.

For further advantages and embodiments of the method with such an arrangement, reference is made additionally to the embodiments of the arrangement described here and the respective advantages thereof that have been described.

According to one embodiment, the fastening member clamps the sleeve against the second turbomachine element via the fastening.

According to one embodiment, this is particularly advantageous, because, as a result thereof, the mechanical connection of the two turbomachine elements in the through-direction, that is, in the direction of the through-axis, occurs via the sleeve and, at least substantially, not via the sliding element and/or, at least substantially, not directly via the first turbomachine element. According to one embodiment, the first turbomachine element is mounted with play between the second turbomachine element and the fastening member in the through-direction.

Use of the arrangement described here in accordance with the invention in a turbomachine, leads to the following:
the first turbomachine element can be displaced relative to the second turbomachine element along the through-axis between the latter and a stop and/or the fastening member and/or
the first turbomachine element can be displaced relative to the second turbomachine element along a displacement axis perpendicular to the through-axis, in particular, is guided in a form-fitting manner, in particular in an elongated hole, and/or
the first turbomachine element cannot be displaced, at least substantially, relative to the second turbomachine element along a transverse axis perpendicular to the displacement axis and perpendicular to the through-axis.

According to one embodiment, this is particularly advantageous, because, as a result thereof, it is possible to provide, in a simple manner, a connection between the first turbomachine element and the second turbomachine element, said connection being established in defined degrees of freedom to a predetermined extent so as to compensate for thermally and/or mechanically induced stresses, at least in part, and/or to transmit them, at least only to a limited extent, from the one turbomachine element to the other turbomachine element. At the same time, any relative movement of the turbomachine elements toward each other in defined degrees of freedom is suppressed at least in part, particularly in full, at least substantially.

BRIEF DESCRIPTION OF THE DRAWING FIGURES

Figure 2:
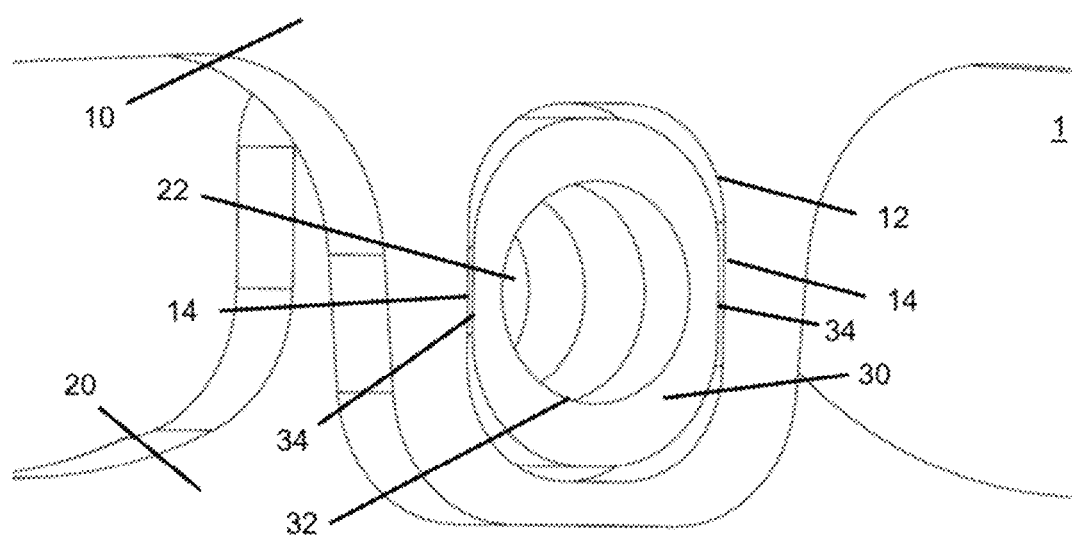
Figure 3:
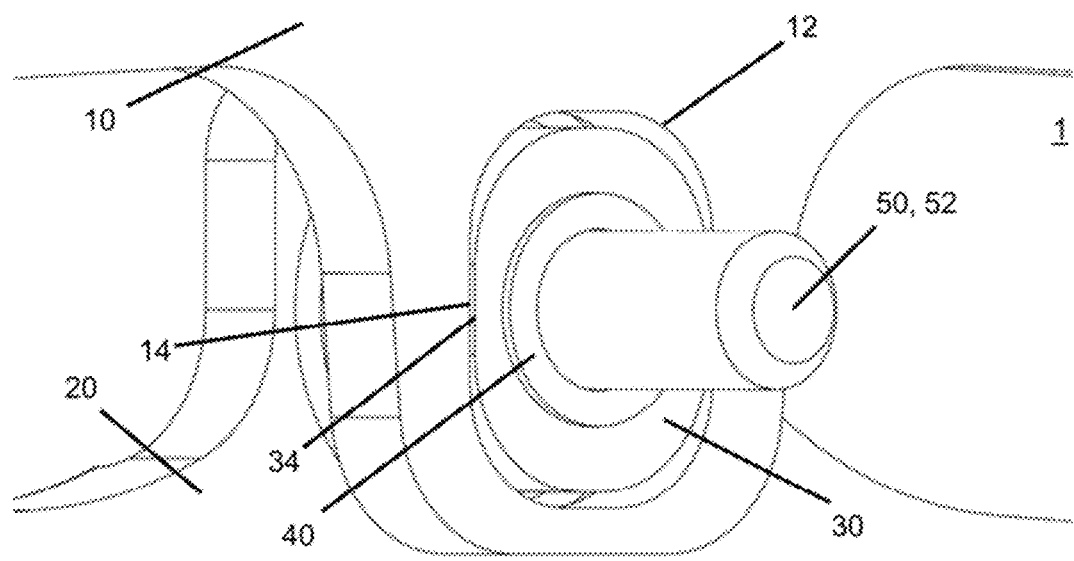
Figure 4:
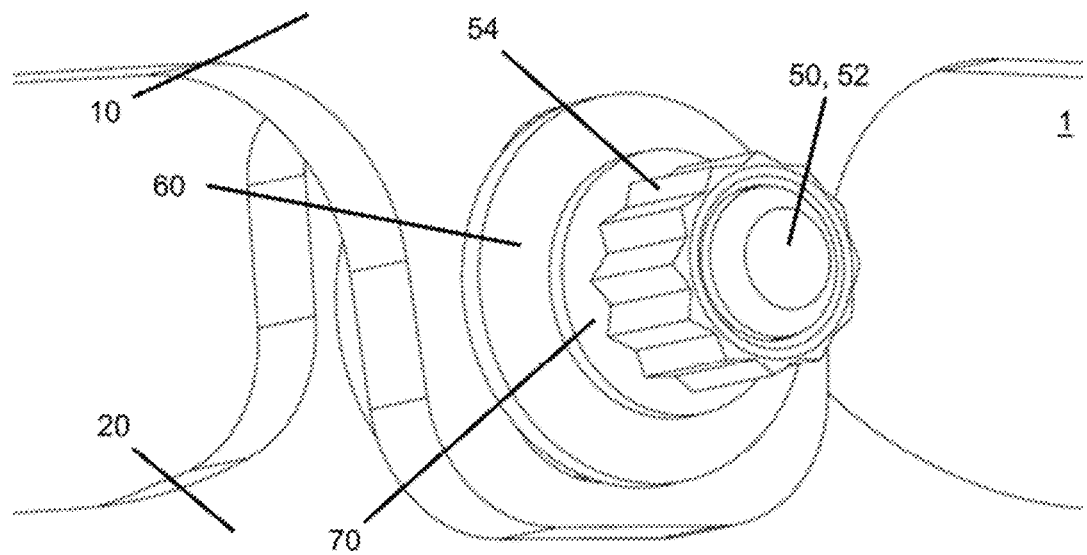
Figure 5:
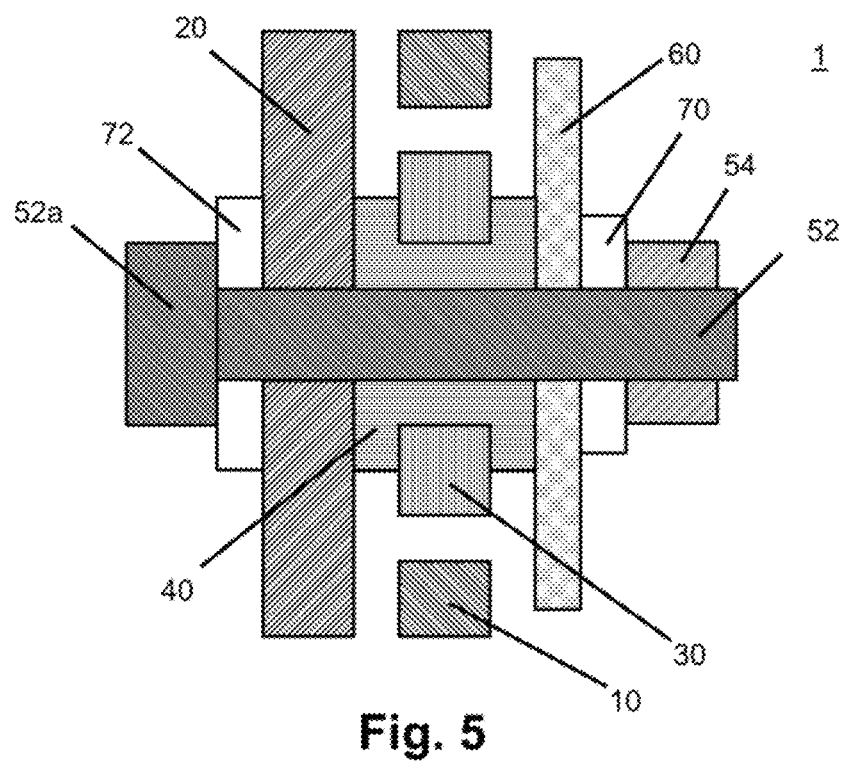

Other advantageous enhancements of the present invention ensue from the dependent claims and the following description of preferred embodiments. Shown for this purpose, in part schematically, are:

FIG. 1: a three-dimensional view of a sliding element of an arrangement according to an embodiment of the present invention;

FIG. 2: a three-dimensional view of a part of the arrangement, in particular without a sleeve, in which the sliding element according to FIG. 1 is arranged in a first turbomachine element through-opening;

FIG. 3: a three-dimensional view of a part of the arrangement, in particular of the sliding element with the sleeve in the first turbomachine element through-opening and at least a part of a fastening member according to an embodiment of the present invention;

FIG. 4: a three-dimensional view of the arrangement according to an embodiment of the present invention in the mounted state; and FIG. 5: a sectional illustration of the arrangement according to an embodiment of the present invention in the mounted state.

DESCRIPTION OF THE INVENTION

FIG. 1 shows a three-dimensional view of a sliding element 30 of an arrangement 1 according to an embodiment of the present invention. The sliding element 30 has a sliding element through-opening 32 and a pair of parallel, flat contact faces 34. The direction of extension of the sliding element through-opening 32 defines a through-axis D and a through-direction. Extending perpendicular to the through-axis D is a transverse axis Q and a transverse direction. The transverse direction Q is, in each case, perpendicular to the two parallel, flat contact faces 34. The direction of extension of the two parallel, flat contact faces 34 defines a displacement axis V and a displacement direction, which are different from the through-direction, each of which are directed perpendicular to the through-axis D and the transverse axis Q.

FIG. 2 shows a three-dimensional view of a part of the arrangement 1, in particular without a sleeve, in which the sliding element 30 according to FIG. 1 is arranged in a first turbomachine element through-opening 12 of a first turbomachine element 10.

The sliding element 30 is arranged at least in part in the first turbomachine element through-opening 12 of the first turbomachine element. The first turbomachine element through-opening 12 is designed in the form of an elongated hole. In this case, the pair of parallel, flat contact faces 34 of the sliding element 30 engage with a pair of flat, parallel contact faces 14 of the first turbomachine element 10. In this case, the contact faces 14 of the first turbomachine element are at least substantially parallel, at least in one area, to the contact faces 34 of the sliding element 30.

As viewed in perspective in FIG. 2 a second turbomachine element 20 is arranged behind the first turbomachine element 10. The second turbomachine element 20 has a second turbomachine element opening 22 in the form of a second turbomachine element through-opening. The second turbomachine element through-opening is designed as a round hole in the embodiment of FIG. 2.

Through the design of the first turbomachine element through-opening 12 in the form of an elongated hole and of the sliding element 30, a form-fitting guiding of the sliding element 30 inside of the elongated hole is provided, which allows a relative movement of the sliding element 30 and the first turbomachine element 10, at least substantially exclusively, in the direction of the displacement axis V. The relative movement is limited by the dimensions of the elongated hole.

FIG. 3 shows a three-dimensional view of a part of the arrangement 1, in particular of the sliding element 30 with a sleeve 40 in the first turbomachine element through-opening 12 and at least a part of a fastening member 50, 52 according to an embodiment of the present invention in a partly mounted state.

The sleeve 40 engages through the sliding element through-opening 32 and is expanded in the through-direction D on both sides in the form of a flange. This flange is formed, for example, by adding to and/or re-forming a region of the sleeve 40.

The fastening member 50, in the form of a screw 52, engages through the sleeve 40. According to one embodiment, the fastening member 50, as viewed in the direction "from behind" along the through-axis D, is inserted, first of all, into the second turbomachine element through-opening 22, in particular until a bolt or screw head (see FIG. 5) indirectly or directly rests against the second turbomachine element 20. During the insertion, the fastening member 50 engages through the sleeve 40, as described above. In this case, the second turbomachine element 20 lies directly or indirectly on the sleeve 40.

FIG. 4 shows a three-dimensional view of the arrangement 1 according to an embodiment of the present invention in the mounted state. In this case, a stop 60 is inserted onto the end of the fastening member 50 projecting forward as viewed from the sleeve 40. This stop 60 is shaped in terms of its dimensions such that it extends beyond the dimensions of the sliding element 30, at least in a direction of extension. In this way, the first turbomachine element 10 is prevented from being able to slip down from the sliding element 30 in the direction of the through-axis D.

Furthermore, a force distribution element 70 in the form of a washer is inserted onto the fastening member 50 after the stop 60.

The remaining parts of arrangement 1 are held in a force-fitting and/or friction-fitting and/or form-fitting manner by a nut 54, which is screwed onto the fastening member 50 in the form of a screw 52, in particular, is secured, particularly against any unlimited relative movement along the through-axis D.

FIG. 5 shows a sectional illustration of an arrangement according to an embodiment of the present invention in the mounted state. The dimensions of the gaps between the first turbomachine element 10 and the second turbomachine element 20 and/or between the first turbomachine element 10 and the stop 60 are to be understood in this case as being illustrated explicitly in a schematic fashion. In regard to this aspect, no limiting statements about the dimensioning can be deduced from the illustration, because the dimensioning is oriented to the respective requirements and/or surrounding conditions at the site of installation.

FIG. 5 shows substantially the above-described construction of the arrangement 1, for which reason reference is made to the above descriptions, which apply here in an identical manner, unless a different manner occurs in an obvious way to the person skilled in the art. In FIG. 5, as already indicated by the reference, the design of the sleeve 40 according to an embodiment of the present invention can be seen especially well: In this case, the rotationally symmetric sleeve 40 has a flange at both ends, which is created by re-forming, in particular by bending overhanging ends of the sleeve. In this way, the force transmission along the through-axis D is taken over by the sleeve 40 in the area of the first turbomachine element 10, so that the sliding element 30 and the first turbomachine element 10 are relieved of the action of this force at least substantially. For the first turbomachine element 10, this obviously applies only as long as it does not rest against the second turbomachine element 20 or the stop 60.

A second force distribution element 72 in the form of a washer is arranged between the screw head 52a and the second turbomachine element 20 in order to improve the force transmission.

Although exemplary embodiments were explained in the preceding description, it is noted that a large number of modifications are possible. Moreover, it is noted that the exemplary embodiments are merely examples, which are in no way intended to limit the protective scope, the applications, and the design. Instead, the preceding description affords the person skilled in the art a guide for the implementation of at least one exemplary embodiment, with it being possible to make diverse changes, particularly in regard to the function and arrangement of the components described, without departing from the protective scope, as ensues from the claims and the combinations of features equivalent to them.

What is claimed is:

1. An arrangement, comprising:
   a first turbomachine element with a first turbomachine element through-opening;
   a second turbomachine element;
   a sliding element with a sliding element through-opening that is arranged, at least in part, in the first turbomachine element through-opening;
   a sleeve engaged through the sliding element through-opening along a through-axis; and
   a fastening member, disposed through the sleeve, for fastening the sleeve to the second turbomachine element,
   wherein the first turbomachine element through-opening has an elongated hole, in which the sliding element is guided in a displaceable manner along a displacement axis perpendicular to the through-axis and is guided in a form-fitting, displaceable manner.

2. The arrangement according to claim 1, wherein the sliding element has a pair of flat contact faces for form-fitting guiding along the displacement axis, which are engaged with corresponding flat contact faces of the elongated hole.

3. The arrangement according to claim 1, wherein the sliding element is mounted rotatably on the sleeve around the through-axis.

4. The arrangement according to claim 1, wherein the fastening member clamps the sleeve against the second turbomachine element.

5. The arrangement according to claim 1, wherein the first turbomachine element is displaceable relative to the sleeve or on the sliding element, such that the first turbomachine element is displaceable along the through-axis between the second turbomachine element and a stop, which is clamped by the fastening member against the sleeve and is connected to the fastening member so as to be releasable without destruction or the stop and the sleeve are integrally formed.

6. The arrangement according to claim 1, wherein a form-fitting and/or force-fitting connection between the first turbomachine element and the second turbomachine element prevents any relative movement between the first turbomachine element and the second turbomachine element along a transverse axis perpendicular to the through-axis and perpendicular to the displacement axis.

7. The arrangement according to claim 1, wherein the second turbomachine element has a second turbomachine element opening that is open on one side, to define a blind bore, or on both sides, to define a through-hole, in which the fastening member engages.

8. The arrangement according to claim 1, wherein the fastening member is a bolt with a bolt head or a screw with a thread or a screw head with one or two nuts screwed onto the screw.

9. The arrangement according to claim 8, wherein a force distribution element, which is inserted onto the fastening member, is arranged between the fastening member and the sleeve.

10. The arrangement according to claim 1, wherein the arrangement is configured in a turbomachine.

* * * * *